June 20, 1961  N. L. SOLOMON  2,988,765
FLARED BRISTLE MOLDED PLASTIC BRUSHES
Filed April 15, 1957
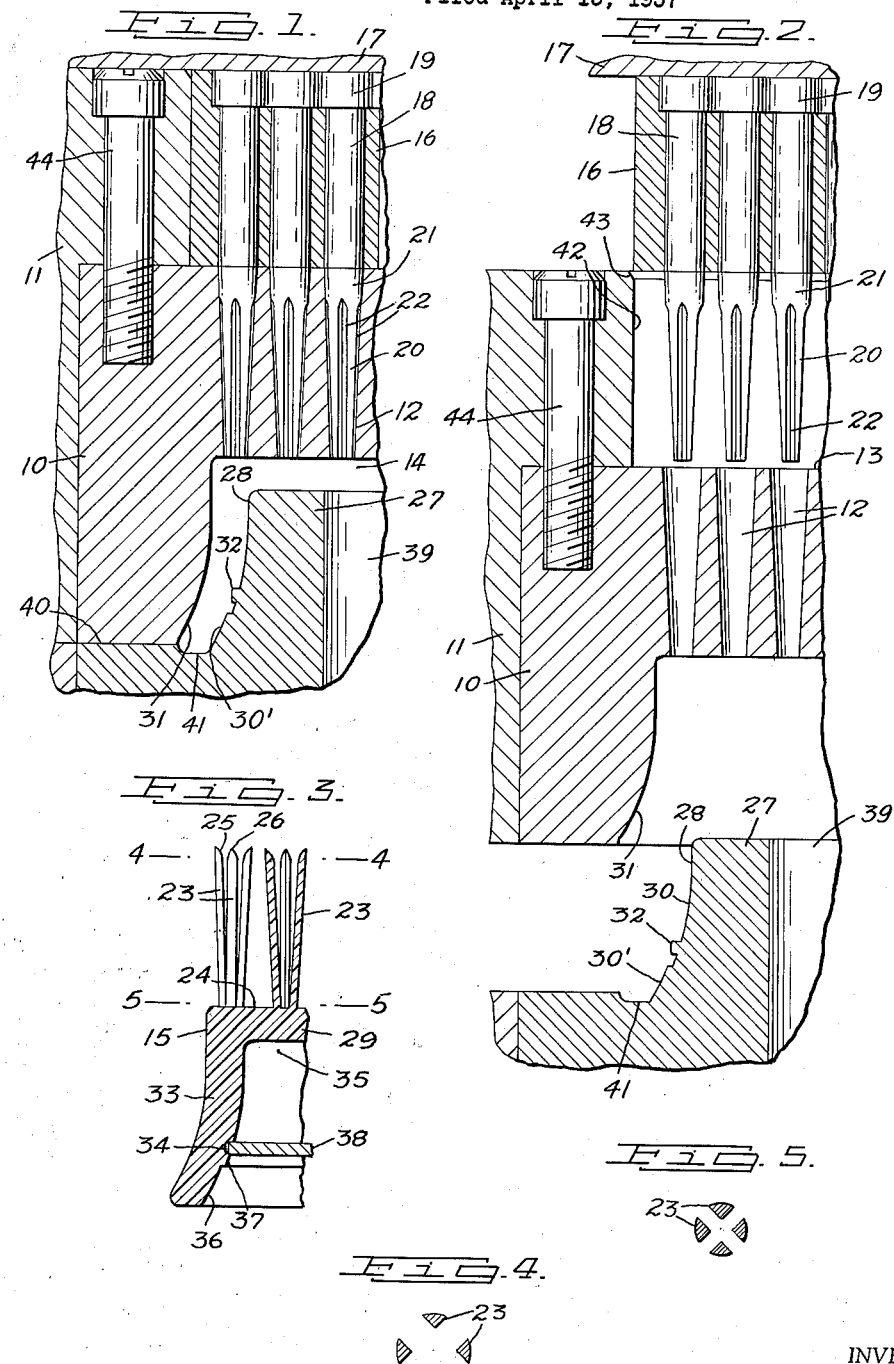
INVENTOR.
NATHAN L. SOLOMON
BY
ATTORNEY

United States Patent Office 2,988,765
Patented June 20, 1961

2,988,765
FLARED BRISTLE MOLDED PLASTIC BRUSHES
Nathan L. Solomon, 343 Highview Road, Englewood, N.J.
Filed Apr. 15, 1957, Ser. No. 652,902
2 Claims. (Cl. 15—187)

This invention relates to molded plastic brushes, wherein the body or back of the brush includes integrally formed bristles on one surface thereof in closely arranged clusters, with each of the bristles of a cluster flared outwardly with respect to the brush body. More particularly, the invention deals with brushes of the character defined, wherein grooved tapered mold pins are arranged in conical cavities of a mold in molding the flared bristle elements and, wherein, the said pins are first removed from the tapered cavities, preparatory to drawing the formed bristles from said cavities by a lower core mold part and, particularly, wherein said core mold part includes means positively engaging the molded brush body to facilitate drawing the formed flared bristles from the conical cavities of the mold.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a partial sectional view of the mold and part of the supporting parts of the mold, showing the same in closed position, preparatory to receiving the plastic material in formation of a brush.

FIG. 2 is a view, similar to FIG. 1, showing the part of the mold parts assumed after formation and withdrawal of the molded brush.

FIG. 3 is a detail sectional view of a small portion of a brush formed from the molds of FIGS. 1 and 2, illustrating one of the brush clusters in section and also indicating a part attached to the brush back or body in actual sale or use of the molded brush.

FIG. 4 is an enlarged section on the line 4—4 of FIG. 3, omitting all background showing; and FIG. 5 is a view, similar to FIG. 4, taken on the line 5—5 of FIG. 3.

To illustrate my improved method of producing molded plastic brushes formed preferably from flexible-type of plastic materials, I have illustrated, in FIGS. 1 and 2 of the drawing, a small portion of the mold structure and, in said figures, 10 represents the primary mold mounted in a suitable supporting plate or block 11. The mold 10 has a multiplicity of closely arranged conical cavities 12, which open through the upper surface 13 of the mold and into a recess or cavity 14, partially forming the body portion or back 15 of the brush to be formed. A small sectional portion of one of these brushes is illustrated in FIG. 3.

At 16 I have shown another block or plate suitably supported on a stripper plate, a small portion of which is indicated at 17. The block 16 supports a multiplicity of pins 18, having heads 19 seated in the upper portion of the block 16. The parts of the pins 18 in the block are otherwise straight or of one diameter, but extending from the lower surface of the block 16 are tapered mold portions 20.

The upper parts of the tapered portions 20, as at 21, seat snugly in the upper portion of the cavities 12, to effect a seal in said cavities and, beyond the sealed portions 21, the tapered ends 20 have a plurality of circumferentially spaced grooves 22 opening through the lower ends of the tapered mold portions. In other words, when the mold is in closed position, the grooves 22 open into the cavity 14 in the lower portion of the die 10, as will clearly appear from a consideration of FIG. 1. The grooves 22 are generally V-shaped in cross-sectional form so as to form bristles 23 which are substantially triangular in cross-sectional form, as will clearly appear from a consideration of FIGS. 4 and 5.

The taper of the mold end portions 20 of the pins 18 will definitely form the bristles 23 in the outwardly flared position, as noted in FIG. 3. Each pin of the mold forms a cluster of bristles extending from the surface 24 of the brush back or body 15, four bristles being in each cluster in the construction shown and opposed bristles in each cluster flare outwardly with respect to each other. It will also be apparent that the outer ends of each bristle are rounded, as seen at 25, to form substantially pointed ends, as at 26.

Turning now to FIGS. 1 and 2, I have shown, at 27, the lower core mold having an upwardly extending core portion 28 which extends into the cavity 14 sufficiently to control the thickness of the back wall 29 of the brush back, the base of the core 28 flaring outwardly, as seen at 30, to conform with the general contour of the correspondingly flared wall 31 of the cavity 14. The core 28 also includes an annular projecting rib 32 adapted to mold, in the resulting flared wall 33 of the brush body, a groove 34. The groove opens into a cavity or recess 35 in the brush body, as will clearly appear from a consideration of FIG. 3.

By providing a slightly enlarged portion 30' at the base of the core 28, an enlarged recess 36 will be formed at the outer end of the cavity 35, thus forming a ledge portion 37 directly below the annular groove 34 to definitely retain a closure card or plate 38 within the cavity 35 which card or plate can be in the form of a decorative closure wall, or as an advertising or display card.

The formation of the annular projecting rib 32 on the mold core 28 provides a definite key engagement between the core mold 28 and the resulting molded brush, so that, after the brush has been formed in the mold when it is in closed position, as noted in FIG. 1, the procedure followed in removing the molded product is as follows.

The stripper plate 17 is first moved upwardly to the position shown in FIG. 2 to withdraw the pins 18 from the cavities 12 and from the molded bristles then positioned in the cavities and, in this operation, the contour of the cavity 14 firmly retains the molded brush body in position. Then, in the next step, the core mold 28 is moved downwardly into a position substantially as shown in FIG. 2 and, in this operation, the key rib 32 establishes a firm engagement with the molded brush body 15 and facilitates withdrawal of the flared bristles 23 through the lower contracted ends of the cavities 12 and, upon freeing said contracted ends, the bristles 23 will again flare outwardly to their definitely molded flared position, as shown in FIG. 3.

The brush body 15 may now be easily stripped or ejected from the core mold 28 by upward movement of a stripper pin 39 shown, in part, in FIGS. 1 and 2, the pin being located centrally with repect to the core mold 28.

Considering FIG. 1, it will appear that 40 represents parting line of the molds, the core mold 28 having a slight recess 41, at its base, forming the closure to the cavity 14 and defining the terminal end of the wall 33 of the brush body 15.

It will appear that the supporting plate 11 for the mold 10 has an aperture 42 to snugly receive the pin supporting plate 16 and the upper end of the aperture 42 is flared, as seen at 43, for guidance of the plate 16 into the aperture 42. The mold 10 is readily attachable and detachable with respect to the plate 11 by a plurality of screws, one of which is illustrated at 44.

It will be understood that, in forming the cavity 14 in the mold 10, the outer wall of the cavity can be characterized in any desired manner to give the desired contour or design to the outer surface of the wall 33 of the brush body 15. It will also be apparent that the cross-sectional contour of the grooves 22 in the pins 18 can be modified to vary the cross-sectional contour of the resulting bristles integrally formed on the brush body. In this connection, it will also be understood that the length of the bristles may be varied to suit the particular type and kind of brush to be formed and the type of flexible plastic material employed can also be varied in controlling the characteristics or intended uses of the resulting brush product.

In the production of brushes according to the method disclosed, it will be understood that the brush back, or body portion, can be of any desired size and contour and, in most instances, the clusters of bristles will be spread over substantially the entire surface of the brush body.

It will also be apparent that the formation or molding of the bristles in the flared position provides greater flexibility and, at the same time, spreads the bristle ends more evenly over the surface of the brush. In other words, the bristles of adjacent clusters are brought into closer proximity to each other at their outer flared ends.

By providing the relatively thin body or back wall 29 with its flared peripheral wall 33, a lightweight body is produced and the wall 29 will provide a degree of flexibility between the clusters of bristles in the use of the brush. Further, the cavity 35 of the brush body provides for the mounting of the plate or the like 38 therein by reason of the means 34, 37 on the wall 33. It will also appear, from a consideration of FIG. 3, that the walls 29, 33 are substantially of the same thickness.

Considering FIGS. 4 and 5 of the drawing, it will appear that inner surfaces of the bristles in each cluster are angularly disposed and, in the cross-sections as shown in said figures, it can be correctly stated that said inner surfaces, at any cross-section throughout the length of the bristles in each cluster, define on said inner surfaces side edges parallel with side edges of adjacent bristles in each cluster.

Having fully described my invention, what I claim as new and desire to secure by Letters Patent is:

1. A molded plastic brush of the character described, comprising a brush body having clusters of bristles projecting integrally from one surface of said body in close relationship to each other, each cluster comprising four bristles protruding independently from the brush body, the bristles of each cluster flaring outwardly from the surface of said body and with respect to each other, each of the bristles in each cluster having angularly disposed inner surfaces, and said inner surfaces, at any cross-section throughout the length of the bristles in each cluster, defining on said inner surfaces side edges parallel with side edges of adjacent bristles in each cluster.

2. A molded plastic brush of the character described, comprising a brush body having clusters of bristles projecting integrally from one surface of said body in close relationship to each other, each cluster comprising four bristles protruding independently from the brush body, the bristles of each cluster flaring outwardly from the surface of said body and with respect to each other, each of the bristles in each cluster having angularly disposed inner surfaces, said inner surfaces, at any cross-section throughout the length of the bristles in each cluster, defining on said inner surfaces side edges parallel with side edges of adjacent bristles in each cluster, said bristles terminating in rounded portions forming pointed ends, and outer surfaces of the bristles being rounded throughout the major portion of their length.

References Cited in the file of this patent

UNITED STATES PATENTS

| | | |
|---|---|---|
| 771,926 | Papenfus | Oct. 11, 1904 |
| 2,152,272 | Ombrello | Mar. 28, 1939 |
| 2,250,112 | Larson | July 22, 1941 |
| 2,355,744 | Myers | Aug. 15, 1944 |
| 2,584,631 | Soss | Feb. 5, 1952 |
| 2,645,804 | Gantz et al. | July 21, 1953 |
| 2,651,810 | Snyder | Sept. 15, 1953 |
| 2,710,982 | Gillem | June 21, 1955 |
| 2,783,490 | Kutik | Mar. 5, 1957 |